Oct. 6, 1942.  R. H. PHELPS  2,297,913
FLEXIBLE CONTROL
Filed April 29, 1940

INVENTOR.
ROSS H. PHELPS
BY Carl J. Barbee
ATTORNEY.

Patented Oct. 6, 1942

2,297,913

UNITED STATES PATENT OFFICE 2,297,913

FLEXIBLE CONTROL

Ross H. Phelps, Kenosha, Wis., assignor to Nash-Kelvinator Corporation, Kenosha, Wis., a corporation of Maryland Application April 29, 1940, Serial No. 332,302

8 Claims. (Cl. 192—99)

This invention relates to flexible controls and has particular reference to means for connecting a control lever on a fixed member to a part to be controlled, which controlled part is arranged to move relative to the fixed member.

It is an object of this invention to provide a flexible control which is easily adjustable.

It is another object of this invention to provide a flexible control which will not transmit vibration from the controlled part to the control member.

It is another object of this invention to provide a flexible control which will have no lost motion between the controlled part and the control member.

It is another object of this invention to provide a flexible control that is less expensive than those known heretofore.

Other objects and advantages of my invention will be apparent from a consideration of the following description and claims and the attached drawing of which there is one sheet and in which—

Figure 1:
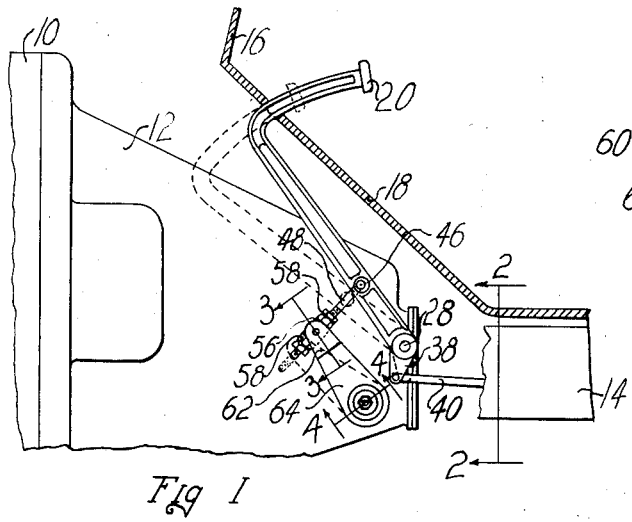
Figure 1 represents a side elevation, partially broken away, of an automobile engine, frame and body.

In the drawing I have illustrated my invention as applied to the clutch and clutch pedal of an automotive vehicle, but as the description proceeds it will be obvious that the same type of connections may be used for connecting any part to be controlled to a control member or lever mounted to move with respect to the controlled part.

It is the common practice in the automotive industry to mount an engine and the attached clutch mechanism of an automobile on the frame of the car with rubber mountings or other flexible means interposed between the frame and engine to prevent the transmission of engine vibration to the frame. These flexible mountings allow the motor to rock and vibrate with respect to the frame to a considerable extent. Most of the rocking of the engine takes the form of rotation about the axis of the crankshaft with respect to the frame. Controls for the engine are mounted on the body which is fixed to the frame and the connection between the control or operating lever, and the controlled part must be provided with some means accommodating the movement of the engine so that little or no movement appears in the control or operating lever.

I have illustrated, by way of example, an engine 10 having an attached housing 12. The engine and housing are mounted, in the manner just described, on the frame of the automobile, a part of which is illustrated at 14. The particular type of flexible mounting does not form a part of this invention and so is not illustrated. Likewise, the particular type of clutch mechanism located within the housing 12 is not illustrated as any well-known type of clutch will function in my invention. The frame 14 supports the body, a portion of which is illustrated at 16 and includes a toe board 18. Extending through the toe board 18 and mounted on the frame 14 are the clutch pedal 20 and brake pedal 22.

Figure 2:
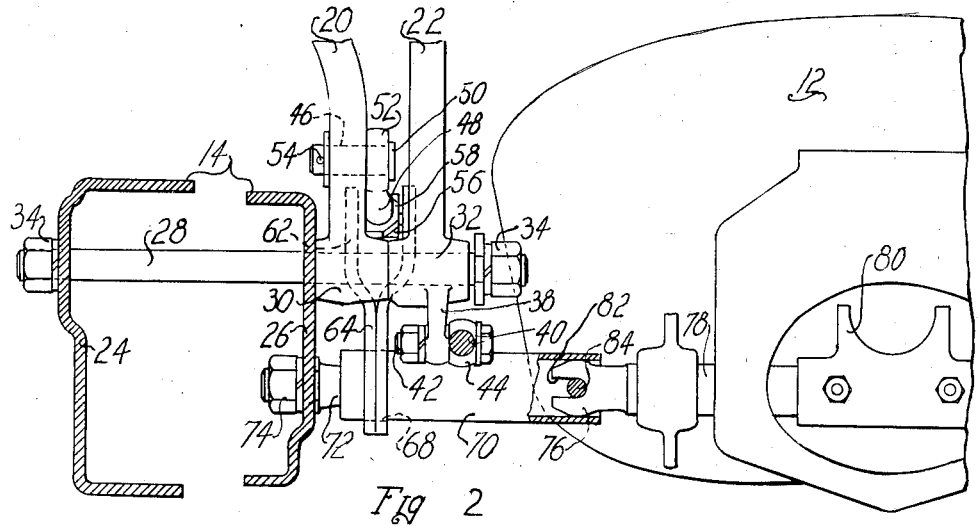
Figure 2 represents a section taken along a plane indicated by the line 2—2 of Figure 1 and looking in the direction of the arrows.

In Figure 2 I have illustrated the frame 14 to consist of a side channel member 24 and a diagonal or X member 26 which is also channel-shaped in cross section. The channel members 24 and 26 are apertured to receive and support the fixed shaft 28 which extends inwardly from the X member 26 and forms a pivot for supporting the hubs 30 and 32 of the clutch pedal 20 and brake pedal 22 respectively. The ends of the shaft 28 are threaded and provided with nuts 34 and washers by means of which the hubs 30 and 32 are drawn against the side of the X member 26 to prevent them from rattling.

The hub 32 of the brake pedal 22 is provided with a crank arm 38 to which the rod 40 is attached by passing a bolt 42 through an eye 44 formed on the end of the rod 40. The rod 40 extends backwardly to suitable brake operating mechanism (not shown).

The clutch pedal 20 is apertured at 46 a short distance from the hub 30 and has connected thereto a rod 48 by means of a flat headed pin 50 passed through the aperture 46 and an eye 52 formed on the end of the rod 48. The pin 50 is retained in place by a washer and cotter pin at 54 (see Figure 2).

Rod 48 is threaded over a considerable length at its lower end and is passed through a block 56. The rod 48 is adjustably maintained in place relative to the block 56 by nuts 58 threaded and locked in place on the rod above and below the block.

Figure 3:
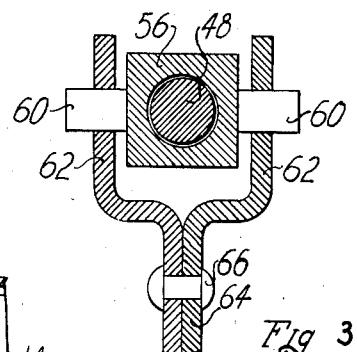
Figure 3 represents a section taken along a plane indicated by the line 3—3 of Figure 1 and looking in the direction of the arrows; and, Figure 4 represents a section taken along a plane indicated by the line 4—4 of Figure 1 and looking in the direction of the arrows.

Carried on the sides of the block 56 at right angles to the rod 48 are two stub shafts 60 which may be welded to the block or formed by machining the block. The shafts 60 are pivotally engaged with the yoke arms 62 of a lever 64. The lever 64 is conveniently formed by bending a strip of material double and bending the yoke arms 62 out at each end. The halves of the lever 64 may be secured together by a rivet 66 (see Figure 3).

The lower end of lever 64 is apertured at 68 and secured as by welding to the outer end of a hollow wobble shaft 70.

Wobble shaft 70 is supported at its outer end on a bell-headed stud 72 which fits within the shaft 70 in a manner which will be more particularly described later. The stud is secured by the nut 74 to the X member 26.

The inner end of the shaft 70 is supported by a ball 76 carried on the end of the clutch operating shaft 78. Clutch shaft 78 is journaled on the walls of the clutch housing 12 and has bolted to its mid-section the yoke 80 which operates in the usual manner to engage or dis-engage the clutch mechanism. The ball 76 is slotted in a horizontal plane at 82 to receive the pin 84 which is secured in the walls at the inner end of the wobble shaft 70.

From the above description it should be evident that my device operates as follows: Downward movement of the clutch pedal 20 about the shaft 28 as a pivot (see dotted lines in Figure 1), moves rod 48 downwardly which in turn rotates lever 64 about the ball-headed stud 72 as a center. Rotation of lever 64 rotates wobble shaft 70 so that the pin 84 engages the sides of the slot 82 in the ball 76 of the clutch shaft 78 and rotates the clutch shaft to operate the clutch mechanism. Rod 48 will pivot about the shafts 60 and the pin 50 to maintain the rod in a position along the line of force applied therethrough. The position of the rod 48 relative to the lever 64 may be adjusted to compensate for clutch wear by changing the position of the nuts 58 on each side of the block 56. It will be noted that the mechanism is at all times positively connected with no lost motion connections and that it is easily adjusted.

Figure 4:
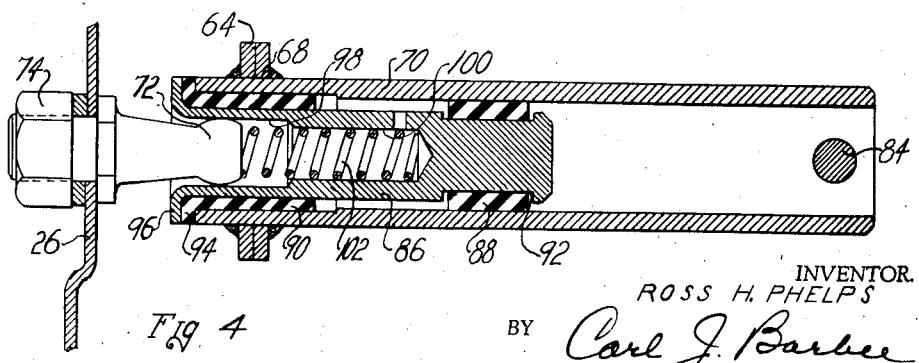

In order to prevent the transmission of vibration from the engine and clutch housing to the frame and clutch pedal, I have provided a tubular bearing 86 within the outer end of the wobble shaft 70 (see Figure 4). The bearing is insulated from the wobble shaft by sleeves or grommets 88 and 90 made of suitable deformable material such as rubber. Sleeve 88 is retained on the shouldered inner end 92 of the tubular bearing 86 and the sleeve 90 has an outturned flange 94 retained between the outer end of wobble shaft 70 and an outturned flange 96 formed on the outer end of the tubular bearing 86. The bearing 86 has a bore 98 of large diameter which receives and supports shaft 70 on the ball-headed stud 72 and a smaller bore 100 which receives and centers the coil spring 102. It will be noted that the inner end 92 of the tubular bearing is closed forming an abutment for the spring 102. The outer end of the spring 102 bears against the flattened end of the ball-headed stud 72.

The spring 102 urges the wobble shaft 70 and pin 84 against the slotted end of the clutch shaft 78 by acting through the flange 96 of the tubular bearing 86 and the flange 94 of the rubber sleeve 90. As the engine 10 vibrates and moves about an axis through its crank shaft as it will, particularly when mounted on rubber mountings as most present day engines are, the wobble shaft 70 will rock on the ball head 76 of the clutch shaft 78 and on the ball-headed stud 72. It will be noted that the lever 64 is fixed to the wobble shaft 70 at the outer end of the shaft near the fixed stud 72. Therefore, even though the clutch shaft 78 and the inner end of the wobble shaft move through a considerable distance, the outer end of the wobble shaft and lever 64 will move very little. The rubber sleeves 88 and 90 will absorb the vibrations of higher frequency. My mechanism is thus arranged to prevent the transmission of vibrations to the frame and clutch pedal and to allow the engine to assume various positions relative to the frame without affecting the position of the clutch pedal.

While I have described my invention in some detail and as applied to a clutch pedal, I intend this description to be an example only and not limiting on my invention to which I make the following claims.

I claim:

1. In an automobile having clutch mechanism rockably supported on a frame, a clutch operating shaft associated with said clutch mechanism, a supporting member fixed to said frame opposite said clutch operating shaft, a wabble shaft supported between said clutch shaft and said supporting member, means comprising a ball and socket joint having a pin extending between the parts thereof and connecting said clutch operating shaft to said wabble shaft for rotation thereby, means comprising a second ball and socket joint supporting said wobble shaft on said supporting member, insulating material supporting the socket member of said second ball and socket joint, and means mounted on said frame for rotating said wobble shaft.

2. In an automobile having clutch mechanism rockably supported on a frame, a clutch operating shaft associated with said clutch mechanism, said shaft having a ball shaped head, a ball shaped pin fixed to said frame opposite the ball head on said clutch operating shaft, a tubular shaft supported between the ball head of said clutch shaft and said ball pin, a pin carried by said tubular shaft engageable in a slot in the ball head of said clutch shaft connecting said clutch operating shaft to said tubular shaft for rotation thereby, an arm secured to said tubular shaft near said fixed ball pin, a clutch pedal pivoted on said frame, and a rod pivotally connected between said clutch pedal and the end of said arm.

3. In an automobile having clutch mechanism rockably supported on a frame, a clutch shaft having a ball shaped head defining a slot, a ball shaped pin secured to said frame, a tubular shaft supported upon said ball shaped pin and ball shaped head and having a pin engaged in said slot, vibration absorbing material positioned between said ball shaped pin and said tubular shaft, and an arm secured to said tubular shaft adjacent the end of said shaft carried by said ball shaped pin.

4. In an automobile having a clutch rockably supported on a frame, a clutch operating shaft associated with said clutch, a tubular shaft having a universal connection with said clutch shaft, a hollow cylindrical plug positioned in the opposite end of said tubular shaft, a rubber bushing positioned between said hollow plug and said tubular shaft, and a ball shaped pin secured to said frame and positioned within said hollow plug.

5. In an automobile having a clutch rockably supported on a frame, a clutch operating shaft associated with said clutch, a tubular shaft having a universal connection with said clutch shaft, a hollow plug positioned in the opposite end of said tubular shaft, a rubber bushing positioned between said hollow plug and said tubular shaft, and a ball shaped pin secured to said frame and positioned within said hollow plug, and a coil spring positioned between said ball shaped pin and the bottom of said hollow plug.

6. In an automobile having a clutch rockably supported on a frame, a clutch operating shaft associated with said clutch, a tubular shaft having a universal connection with said clutch shaft, a hollow plug positioned in the opposite end of said tubular shaft, a rubber bushing positioned between said hollow plug and said tubular shaft, and a ball shaped pin secured to said frame and positioned within said hollow plug, said hollow plug having internal bore of reduced diameter arranged to center a coil spring.

7. In combination with an automobile having clutch mechanism rockably supported on a frame, a clutch operating shaft having a ball shaped end defining a slot opened to the end of said shaft, a ball shaped pin secured to said frame opposite the ball shaped end of said clutch shaft, a tubular shaft having a pin in one end thereof engaged in said slot, an outwardly flanged hollow plug positioned in the other end of said shaft, and a flanged deformable bushing positioned between said tubular shaft and said hollow plug, the flange on said bushing separating the end of said tubular shaft and the flange on said hollow plug, said hollow plug having said ball pin received within it and a spring within the bore of said hollow plug abutting against said ball pin to urge said plug into said tubular shaft.

8. In combination with an automobile having a clutch rockably supported on a frame, a clutch shaft for operating said clutch, a wobble shaft supported between said clutch shaft and said frame, a clutch pedal pivoted on said frame, an arm secured to said wobble shaft and having a yoke formed at one end thereof, a plug defining an aperture and having stub shafts extending from two sides thereof at right angles to said aperture and journalled in the arms of said yoke, a rod pivotally connected to said clutch pedal and extending through the aperture in said plug, and nuts threaded on said rod above and below said plug.

ROSS H. PHELPS.